United States Patent

Paine et al.

[15] 3,658,295
[45] Apr. 25, 1972

[54] VALVE SEAT

[72] Inventors: T. O. Paine, Administrator of the National Aeronautics and Space Administration with respect to an invention of; George L. Root, Lancaster, Calif. 93534

[22] Filed: Feb. 4, 1970

[21] Appl. No.: 8,636

[52] U.S. Cl. .................................................. 251/360
[51] Int. Cl. ...................................................... F16k 51/00
[58] Field of Search ................ 251/360, 361, 362, 333, 368

[56] References Cited

UNITED STATES PATENTS

| 1,200,668 | 10/1916 | Swanberg | 251/360 |
| 2,454,160 | 11/1948 | Greene | 251/361 X |
| 2,598,187 | 5/1952 | Meyer | 251/360 X |
| 2,661,753 | 12/1953 | Stroop | 251/361 X |
| 2,914,295 | 11/1959 | Witzky et al. | 251/368 X |
| 2,927,737 | 3/1960 | Zeuch et al. | 251/333 X |
| 3,131,906 | 5/1964 | King | 251/360 |
| 3,510,103 | 5/1970 | Carsello | 251/333 |

Primary Examiner—Samuel Scott
Attorney—G. T. McCoy, J. H. Warden and Monte F. Mott

[57] ABSTRACT

A valve seat of an annular configuration having a segmented valve sealing surface including a cylindrical surface extending concentrically through the seat defining a substantially full-flow throat terminating in a first outwardly flared conical sealing surface segment which, in turn, terminates in a second outwardly flared conical surface segment, a feature of the seat being the inclusion of a pair of coaxially arranged conical surface segments circumscribing the throat of the valve seat whereby a reduced-stress area sealing surface is provided for receiving a plug and the life of the valve seat is increased.

1 Claims, 4 Drawing Figures

PATENTED APR 25 1972 3,658,295

GEORGE L. ROOT
INVENTOR

ATTORNEYS

VALVE SEAT

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The invention relates to an improved valve seat for a fluid-flow control system and more particularly to an improved valve seat particularly adapted to be utilized in supply systems employed in delivering liquid fuels and oxidizers to reaction motors.

2. Description of the Prior Art

Valve seats heretofore employed normally are provided with a valve-sealing surface of a truncated, frusto-conical configuration intersecting and circumscribing the throat of a valve. The throat extends through the valve seat for purposes of conducting a flow of fluid therethrough while the sealing surface receives a mating surface of an axially reciprocable valve plug. Normally, the plug is so fabricated as to include a frusto-conical surface which is inserted and seated on the valve seat in a manner such that the interface between the surfaces of the plug and the seat establish a highly loaded line intersection. Also, it has been common practice to fabricate the seats from elastomers, including fluorinated hydrocarbon. Under repetitive recycling, the material forming the valve seat experiences peening, rolling and general deformation often resulting in valve leakage. Where the valve seat is being employed in a liquid fluorine or diborane system, leakage is extremely hazardous to both personnel and materials. This is particularly true when employed in the testing of reaction motors due to the requirement that fluid flow control to the motor must be quite accurate, even in a repetitive-use environment.

OBJECTS AND SUMMARY OF THE INVENTION

It is therefore an object of the invention to provide an improved valve seat for use in controlling the flow of fluids in high-pressure fluid delivery systems.

It is another object to provide an improved valve seat for use in controlling the flow of fuels and oxidizers in liquid propellant delivery systems for reaction motors.

Another object is to provide an improved valve seat having a face which will not experience peening and rolling into the throat of the seat.

Another object is to provide for use in high-pressure systems an improved valve seat for enhancing valve performance in controlling the flow of corrosive fluids through high-pressure fluid conduits.

These and other objects and advantages are achieved by altering the surface configuration of the face of a valve seat by providing an annular chamfer defining a frusto-conical surface circumscribing the upstream end of a cylindrical surface of the throat to change the interface between the mating surfaces of a valve plug from a thin, highly loaded line-intersection to a reduced-stress area intersection.

DESCRIPTION OF THE PREFERRED EMBODIMENTS

Figure 1:
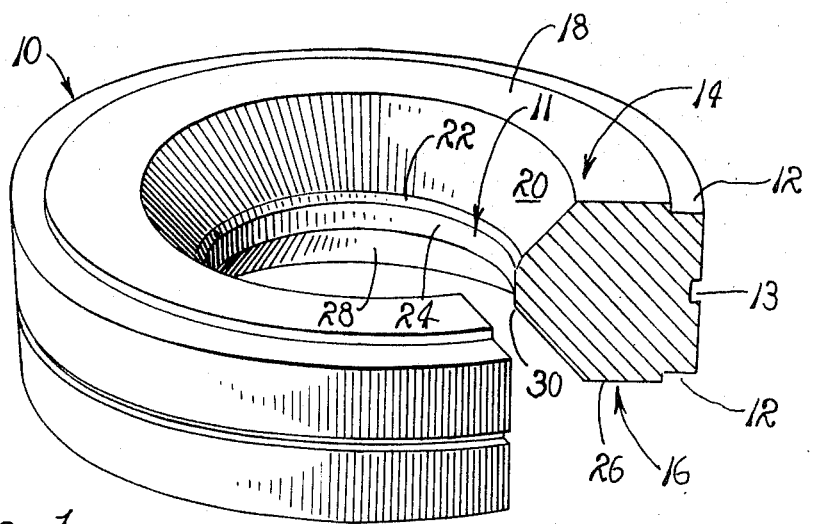
FIG. 1 is a partially sectioned, perspective view of a valve seat embodying the principles of the present invention.
Figure 2:
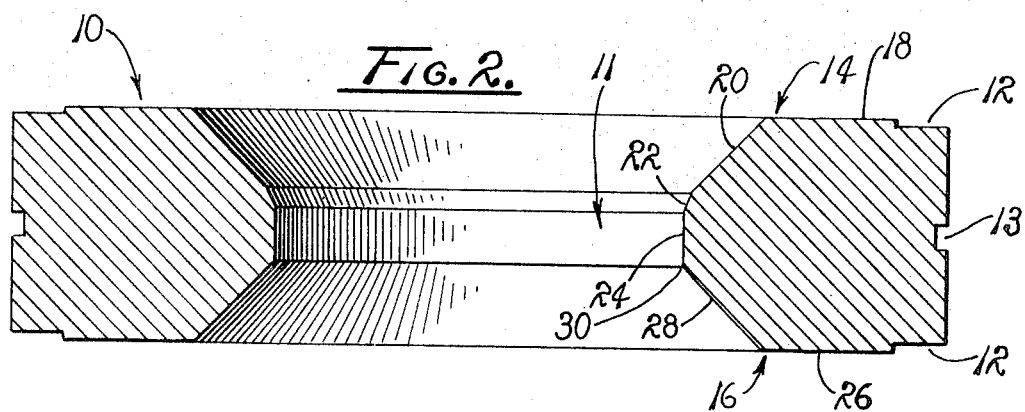
FIG. 2 is a cross-sectional view of the valve seat of FIG. 1, on somewhat of an enlarged scale, illustrating the reduced stress area provided for the valve seat of FIG. 1.

Turning to FIG. 1, therein is illustrated a valve seat 10 having a throat or passage 11 extended therethrough. The seat is intended to be inserted within a flow control valve, not shown, coupled with a fluid delivery conduit, also not shown. The valve within which the value seat is seated is provided with a reciprocating plug adapted to be displaced relative to the surface of the valve seat for purposes of controlling the flow of fluid delivered by the associated conduit.

The valve seat 10 is of a generally annular configuration and includes an annular shoulder 12 formed about the periphery of its opposite side surfaces. The recesses 12 are employed in seating and sealing the valve seat within the given valve. However, it should be readily apparent that the specific manner in which the valve seat is inserted and seated within a given valve is a matter of convenience dictated by the particular design of the valve. As presently employed, the valve seat is further provided with a peripheral groove 13 adapted to receive therein an annular seal, not shown. Such a seal is particularly useful where the system within which the seat is employed is a high-pressure system. In practice, the valve seats are formed from heat-treated metallic materials, such as substantially pure copper which are heated to approximately 300° F. for 4 hours and then oven-cooled.

The valve seat 10 embodying the principles of the instant invention is provided with a segmented upstream surface 14 and a substantially uninterrupted downstream surface 16. The surface 14 radially is extended into the stream of fluid being conducted through the associated valve in a manner such that its surface interrupts and restricts the flow of fluid established through the associated valve. This surface is segmented into a planar transverse segment 18 which extends from the periphery of the seat and intersects a first frusto-conical surface 20, which surface terminates in an annular surface segment 22, also of a frusto-conical configuration circumscribing the throat 10 and terminates in a cylindrical surface 24, which surface defines the throat 11 of the valve seat.

Figures 3, 4:
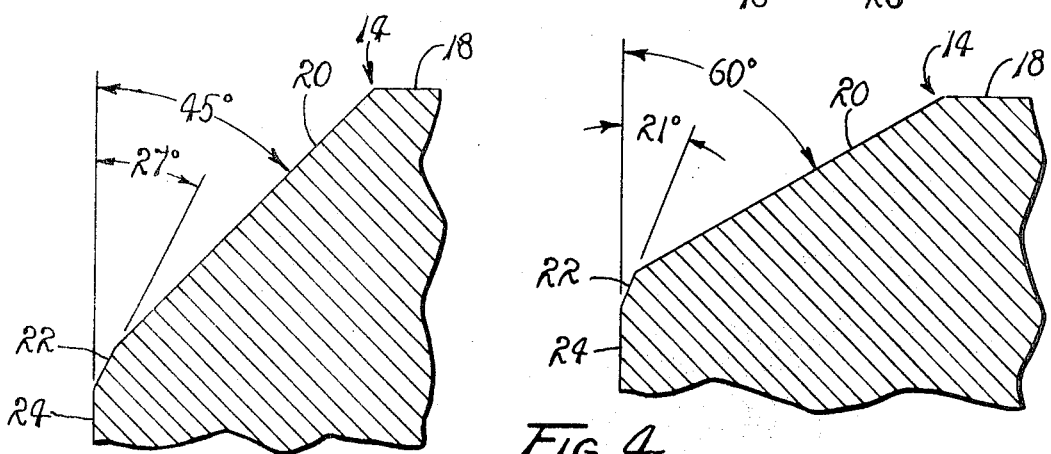
FIG. 3 is a fragmentary view, on somewhat of an enlarged scale, illustrating the segmented sealing surface of the valve seat of FIG. 1 depicting the angular relationship established between the throat of the valve seat and the valve-sealing surfaces of one embodiment of the invention.
FIG. 4 is a fragmentary view, quite similar to FIG. 3, but illustrating the angular relationship established between the throat of the seat and the valve-sealing surfaces of another embodiment of the instant invention.

As illustrated in FIG. 3, where the surface segment 20 defines an included angle of 45° with respect to the axis of the throat 11, the surface 22 defines an included angle of 27° with the axis of the throat. However, as illustrated in FIG 4, where the surface 20 defines an included angle of 60° with the axis of the throat 11, the surface 22 defines an included angle of 21° with the longitudinal axis of the throat 11.

It is important to note that the specific included angles are determined by the configuration of the valve plug which is to be seated therein and may be varied accordingly. The included angle of the surface 22 is such that this surface mates with the external surfaces of the plug in a manner such that deformation and rolling of the metal adjacent to the throat 11 is precluded. As a practical matter, it has been found that the depth of the segment 22, as it axially extends into the throat may be varied, however, normally the surface is formed by chamfering or "lapping" the shoulder from the intersection between the surfaces 20 and 24 for thus causing the surface segment 22 to conform to the shape of the surface of the valve plug.

The downstream surface 16 of the valve seat 10 includes a transverse surface 26 terminating in a truncated frusto-conical surface 28 which junctions with the cylindrical surface 24 in a manner such as to reduce turbulence as the fluid is delivered through the throat of the valve. As this surface normally is not employed as a valve seat in sealing the valve the surface terminates at a sharpened shoulder 30.

In view of the foregoing, it should be readily apparent that the principles of the present invention are embodied in a practical valve seat which readily may be employed in high-pressure, high-corrosive systems for accurately controlling the flow of fluid through a flow-control valve over an extended period during which a valve plug repetitively is seated on the surface, without experiencing material peening or a rolling of the material of the valve seat into its throat for thus enhancing flow-control and extending the service life of the valve.

Although the invention has been herein shown and described in what are conceived to be the most practical and preferred embodiments, it is recognized that departures may be made therefrom within the scope of the invention, which is not to be limited to the illustrative details disclosed.

What is claimed is:

1. An improved valve seat for use in valves employed in controlling flow of fuels and oxidizers for reaction motors comprising:

a disk-shaped member formed of substantially pure copper material including a substantially cylindrical wall defining a throat axially extended through said member and circumscribed by a segmented sealing surface of a substantially annular configuration, including a first frusto-conical segment extending outwardly from said wall at a first included angle of 21° with respect to the axis of the throat and outwardly terminating in a second truncated frusto-conical segment extending outwardly from said wall at a second included angle of 60° with respect to the axis of said throat, whereby a peening and rolling of the copper material into the throat is obviated for thereby increasing the operative life of the valve seat.

* * * * *